United States Patent Office 2,766,200
Patented Oct. 9, 1956

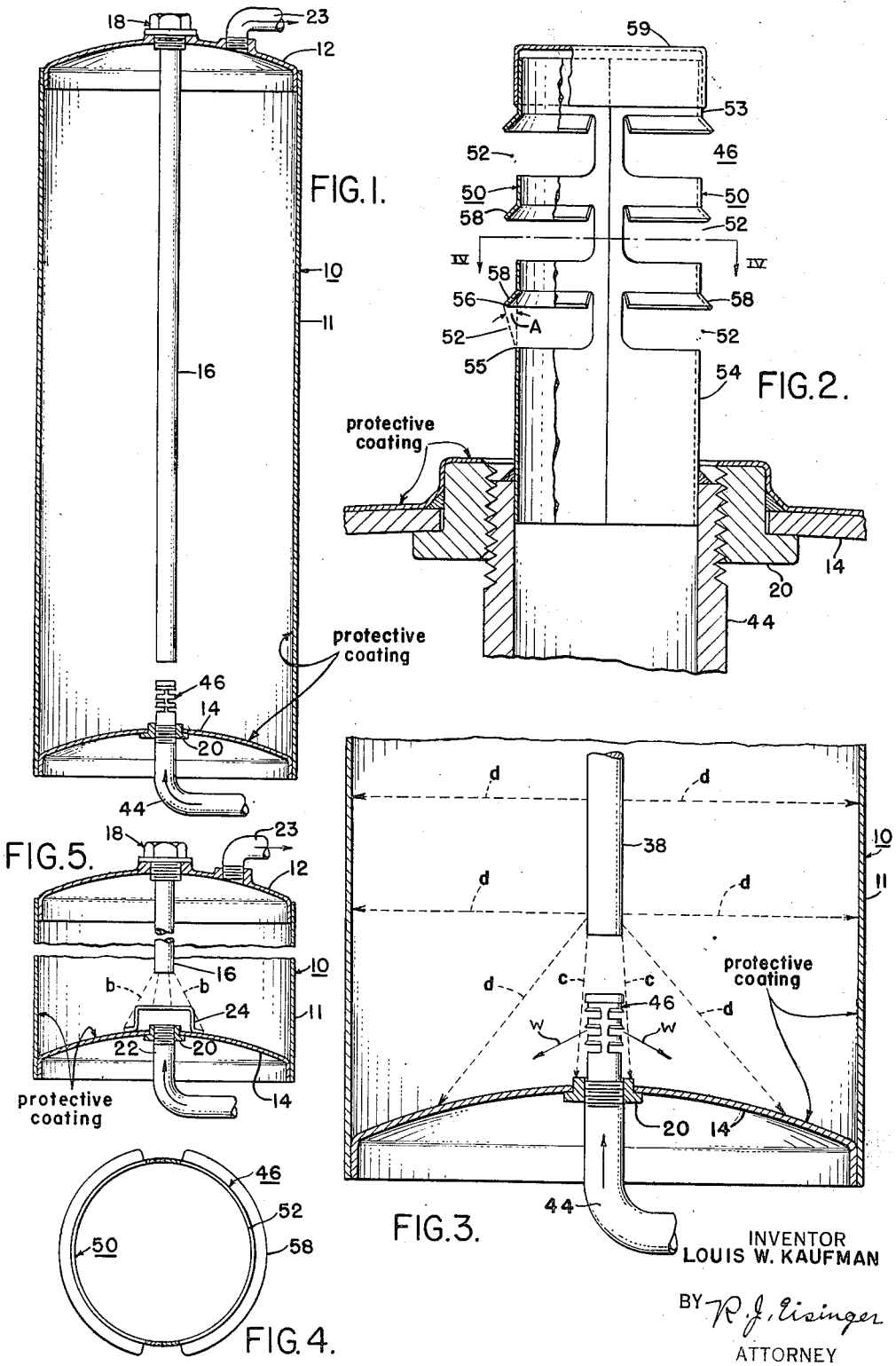

2,766,200

WATER HEATING APPARATUS

Louis W. Kaufman, Mansfield, Ohio, assignor to Westinghouse Electric Corporation, East Pittsburgh, Pa., a corporation of Pennsylvania Application September 4, 1952, Serial No. 307,825

2 Claims. (Cl. 204—197)

This invention relates to cathodically protected water heaters of the domestic type, more particularly to a baffle for reducing turbulence of the water in the tank, which would otherwise be caused by the force of the influent water to such a water heater. Baffles of this type divert the influent water radially in directions normal to the original direction of flow, dissipating most of the energy in the water and preventing undue mixing of the hot and cold water in the tank. This effect is generally termed stratification and is highly desirable.

At the present time it is a common practice to provide an anode to protect the interior wall surfaces of water tanks against the corrosive action caused by electrolysis. Also, instead of providing an anode, the inside surfaces of such water tanks have been coated with protective materials to reduce the corrosive effect caused by electrolysis. However, it has been found that even though the interior surfaces of a water tank are coated with a protective coating, corrosion may appear at weak spots or pin holes in the protective coating.

As a further precaution against corrosion due to electrolysis in tanks having a protective coating, anodes have been incorporated therewith to protect such exposed tank wall surfaces. Protective current flowing from the anode to the tank walls counteracts the electrolytic currents. However, such tanks are usually provided with a rather large baffle surrounding the inlet opening in the bottom of the tank, to stratify the influent water and prevent mixing of the cold water in the lower portion of the tank with the heated water in the upper portion of the tank. In such constructions, the baffle is disposed between the protective anode and a portion of the inside surface of the tank and "shades" this portion of the tank wall from the protective current of the anode. This "shading" or "shadow effect" prevents the anode from properly protecting this portion of the tank wall. This portion of the tank wall is usually the most difficult to coat properly. Sharp edges on the threaded fitting for the inlet pipe may protrude through the protective coating, thereby presenting localized spots which are readily attacked by electrolytic currents in the absence of protective current from the anode and hastening failure of the tank.

In view of the above, it is an object of the invention to provide a baffle which is readily insertable into or removable from the tank after assembly, thereby facilitating the coating of the inner surface of the tank.

A further object is to provide a water heater having a protective anode for counteracting the electrolytic currents and having a baffle connected to the influent pipe to provide stratification of the incoming water, said baffle being so formed and arranged that it minimizes the "shadow effect" adjacent the influent pipe connection.

A further object is to provide a baffle for a water heater, which baffle is inexpensive to manufacture, of simple construction, and of small size for ready insertion or removal from the tank.

These and other objects are effected by my invention as will be apparent from the following description taken in connection with the accompanying drawings, forming a part of this application, in which:

Fig. 1 is a vertical sectional view of a water heater having my invention incorporated therein;

Fig. 2 is a view on a larger scale, showing my improved baffle, partly in section and partly in elevation, a portion of the tank wall and the associated fitting being shown to illustrate the manner of assembly;

Fig. 3 is an enlarged sectional view similar to Fig. 1, but showing only the lower portion of the water heater;

Fig. 4 is a section taken on the line IV—IV of Fig. 2; and

Fig. 5 is a fragmentary vertical section of a prior water heater construction.

For an understanding of the invention and to illustrate the improvement over the prior art, a prior construction has been shown in Fig. 5. Since water heaters of this type are generally well known, Fig. 5 is a fragmentary and shows only the essential elements of such a construction, namely, a substantially cylindrical water tank 10 which is the same as the water tank illustrated in Figs. 1 to 4, inclusive, and comprises a tubular wall 11, an upper end wall 12 and a lower end wall 14. The upper end wall 12 is provided with a central threaded opening through which is inserted an anode 16. The anode 16 may be of any known type. For example, it may be of the sacrificial type, in which case the anode 16 is a zinc or magnesium rod having its upper end connected to the upper end wall 12 in good metal-to-metal contact, as by an externally threaded metal bushing 18. The lower end wall 14 is provided with a central opening within which is inserted an internally threaded bushing 20, fastened thereto in any well-known manner as, for example, by welding. An inlet pipe 22 is received in the bushing 20 and serves to discharge cold water into the lower portion of the tank. An outlet pipe 23 is connected to the upper end wall 12 for drawing heated water from the tank as desired.

In the prior construction shown in Fig. 5, the lower end wall 14 has attached to the inner surface thereof a sheet metal baffle 24 directly above the open end of the pipe 22. Thus, as water from the pipe 22 enters the tank, it strikes the baffle 24 and is diverted thereby in a substantially horizontal direction, minimizing mixing of the incoming cold water in the lower portion of the tank with the heated water in the upper portion of the tank. The baffle 24 is usually attached to the inner surface of the end wall 14, prior to assembly of the end wall in the tank, by welding or the like. The inner surfaces of the tank 10 are provided with a protective coating which may be metallic, such as a zinc coating, or organic, such as a phenolic resin. Such coatings are applied to the tank after the baffle is in position. Obviously, the surface of the end wall 14 directly under the baffle 24 is rendered very difficult to coat thoroughly and may have uncoated portions which cannot be readily detected.

I have found that the protective currents from the anode 16 are primarily effective between the anode and the inner surfaces of the tank, within the "line of sight" of the anode. The surface directly behind the baffle 24 lies in the "shadow" of the baffle 24, within the area included by the dotted lines b—b', and is thereby prevented from being affected by the protective currents set up by the anode. Current from the anode will flow to the baffle and will not be effective to protect the surface adjacent the influent pipe 22 and the fitting 20. Localized electrolysis will attack any exposed metallic surfaces in this "shaded" area and accelerate failure of the tank in this region, even though the remainder of the tank is well protected by the anode.

Referring to Figs. 1 to 4, inclusive, and especially Fig. 1, I have shown my invention incorporated in a water heater comprising a water tank 10 similar to that described in connection with Fig. 5.

The inner surfaces of the tank 10 are provided with a protective coating which is preferably organic in nature, such as, for example, a phenolic resin.

The lower end wall 14 is provided with an opening having an internally threaded bushing 20 welded or otherwise fastened thereto in a central position for receiving an influent pipe 44 in a manner similar to the construction shown in Fig. 5. The upper or open end of the pipe 44 has my improved baffle 46 mounted thereon and extending upwardly into the tank to a point below the anode 16.

The baffle 46, as best shown in Figs. 2 and 4, is substantially tubular, having a cross section of smaller size than the influent pipe 44, and is readily removable through the bushing 20. The baffle 46 is made entirely of sheet metal formed to a generally cylindrical shape, and comprises a tubular portion preferably formed of two identical mating semi-cylindrical members 50. Each of the semi-cylindrical members 50 is provided with a plurality of axially spaced openings or discharge ports 52 disposed between an upper and a lower semi-cylindrical marginal portion 53 and 54, respectively. The discharge ports 52 extend circumferentially through a central angle of almost 180 degrees. Each of the ports 52 has a lower edge 55 and an upper edge 56. The upper edge 56 is provided by an outwardly bent deflecting skirt portion 58 of arcuate shape (as seen in Fig. 4) and is disposed radially outward beyond the lower edge 55. The skirt portions are formed by lancing or bending outwardly the marginal portions adjacent the ports, and are disposed at an angle on the order of 45 degrees to the longitudinal axis of the semi-cylindrical portions 50.

The ports 52 are inclined at an angle A to the longitudinal axis of the cylindrical portions 50 for a purpose which will be described subsequently. The angle A may be varied to suit the particular application, and in the embodiment shown it is on the order of 16 degrees.

The two semi-cylindrical portions 50 are disposed in abutting relationship to each other in such a manner as to form a hollow cylinder open at each end. As shown in Fig. 2, a sheet metal cap member 59, in telescoping engagement with the upper marginal portions 53 of the semi-cylindrical portions 50, is permanently united to the semi-cylindrical portions 50 as by soldering. The lower marginal portions 54 of the semi-cylindrical portions 50 form a cylinder of a diameter coinciding with the inner diameter of the pipe 44 and are received therein in telescoping engagement to complete the assembly. The baffle 46 may be rigidly attached to the pipe 44 by means of welding or soldering.

In operation, the baffle serves to spread the incoming cold water from the pipe outwardly into the tank through the ports 52. The upward component of force of the water is reduced by the cap member 59. The angle A of the ports 52 is such that the remaining upward component of force of the water is nullified. With the ports disposed at the angle A, the direction of the water is changed and the discharge is effected from the baffle at a slight downward angle to the horizontal (as indicated in Fig. 3 by the arrows W). The discharge is divergent radially with respect to the longitudinal axis of the baffle 46.

The total area of the discharge ports 52 is larger than, and preferably on the order of 1.5 to 2.5 times as large as the cross-sectional area of the pipe 22. The water is thus discharged into the tank at a velocity which is substantially reduced from the velocity of the water in the pipe.

With this arrangement, turbulence within the tank is minimized and stratification of the water entering the tank is attained. The incoming cold water spreads outwardly from the baffle 46 at a reduced velocity and in a slightly downward direction relative to the horizontal. The incoming cold water will remain in the lower part of the tank and will not rise to the upper part of the tank until such a time as water is drawn therefrom for use.

With this arrangement the water which has been heated in the tank will remain intact in the upper part of the tank and will not be subject to dilution caused by turbulence of the incoming cold water.

As shown in Fig. 3, the baffle 46 imposes a "shadow effect" on the end wall 14 which is the area included between the lines $c$—$c'$. This effect is considerably smaller than the "shadow effect" included between the lines $b$—$b'$ of the prior art shown in Fig. 5. The "shadow effect" $c$—$c'$ is a relatively small circular area of substantially the same diameter as the baffle 46; thus, at least a portion of the threaded bushing 20 and the tank surface adjacent to it are within the "line of sight" of the anode 16 and exposed to current flowing therefrom. Any pin holes in the protective coating in this area will receive protective current from the anode, thereby substantially reducing the possibility of corrosion caused by localized electrolytic currents. Pin holes occurring in other portions of the protective surface are protected by currents denoted by lines $d$.

Although my invention has been described as incorporated in a water heater having a coating on the inner surfaces of the tank, it may also be incorporated to advantage in a water heater having a tank in which the inner wall surfaces are uncoated.

The baffle 46, being made of sheet metal, punched and formed to shape by means of dies, as well known in the art, effects a substantial saving in manufacturing costs, is ideally suited for its purpose, and is easily installed.

Also, since the baffle is inserted into the tank after fabrication of the tank, the protective coating is more easily distributed throughout the portion of the lower tank wall 14, thereby minimizing the occurrence of pin holes and uncoated portions in this area.

While I have shown my invention in but one form, it will be obvious to those skilled in the art that it is not so limited, but is susceptible of various changes and modifications without departing from the spirit thereof.

What I claim is:

1. In combination, a water heater comprising a tank having an upper and a lower wall, a protective anode connected to said upper wall and extending into said tank a substantial distance about an axis, said lower wall having an opening, and a baffle supported in said opening and extending upwardly into said tank to a point below said anode, said baffle having a generally cylindrical tubular wall portion disposed vertically in coaxial alignment with the anode and having an end wall closing the upper end of said tubular wall, said tubular wall having a plurality of ports for discharging water into said tank in a direction transverse to the axis of said tubular wall, the cross-sectional area of said baffle being no greater than the cross-sectional area of said anode, thereby exposing substantially the entire surface of said lower wall to the protective action of said anode.

2. The structure recited in claim 1 including an inlet pipe terminating in said opening, said baffle having one end disposed within said inlet pipe and secured thereto, said pipe and said baffle being removable from or attachable to said tank as a unit.

References Cited in the file of this patent

UNITED STATES PATENTS

| | | |
|---|---|---|
| 1,039,794 | Perew | Oct. 1, 1912 |
| 2,065,343 | Moore | Dec. 22, 1936 |
| 2,459,123 | Bates et al. | Jan. 11, 1949 |
| 2,508,171 | Kaufman | May 16, 1950 |
| 2,514,642 | Holmes | July 11, 1950 |
| 2,566,324 | Frese | Sept. 4, 1951 |
| 2,600,521 | Swisher | June 17, 1952 |
| 2,602,465 | Goehring | July 8, 1952 |
| 2,636,512 | Smith | Apr. 28, 1953 |